United States Patent [19]
Kelly et al.

[11] 3,898,661
[45] Aug. 5, 1975

[54] MINI-REGENERATOR

[75] Inventors: Ronald N. Kelly, Bedford; Louis Henry Goulston, Stoughton, both of Mass.

[73] Assignee: The United States of America as represented by the Secretary of the Air Force, Washington, D.C.

[22] Filed: Nov. 29, 1973

[21] Appl. No.: 418,318

[52] U.S. Cl. ............................. 343/18 E; 343/18 B
[51] Int. Cl.² ........................................ H04K 3/00
[58] Field of Search ........................ 343/18 B, 18 E

[56] References Cited
UNITED STATES PATENTS

| 3,064,575 | 11/1962 | Schermuly | 343/18 E |
| 3,143,965 | 8/1964 | La Pointe | 343/18 E |
| 3,626,415 | 12/1971 | Montgomery | 343/18 E |
| 3,741,125 | 6/1973 | La Pointe | 343/18 E X |
| 3,754,256 | 8/1973 | Nystrom | 343/18 E |

*Primary Examiner*—Malcolm F. Hubler
*Attorney, Agent, or Firm*—Joseph E. Rusz; Jacob N. Erlich

[57] ABSTRACT

A mini-regenerator for the dispensing of radar chaff or the like having a housing in which the radar chaff are located and means for expelling individual radar chaff at a predetermined timed sequence. The expelling means is in the form of a pusher plate threadably engaged to a lead screw. Upon the rotation of the lead screw by a drive mechanism the pusher plate forces individual radar chaff from the housing in a timed sequence.

4 Claims, 3 Drawing Figures

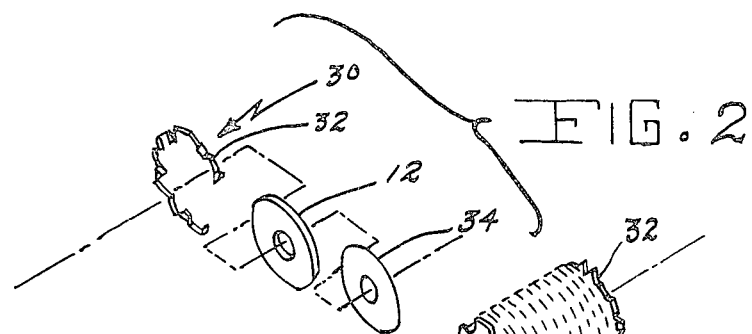
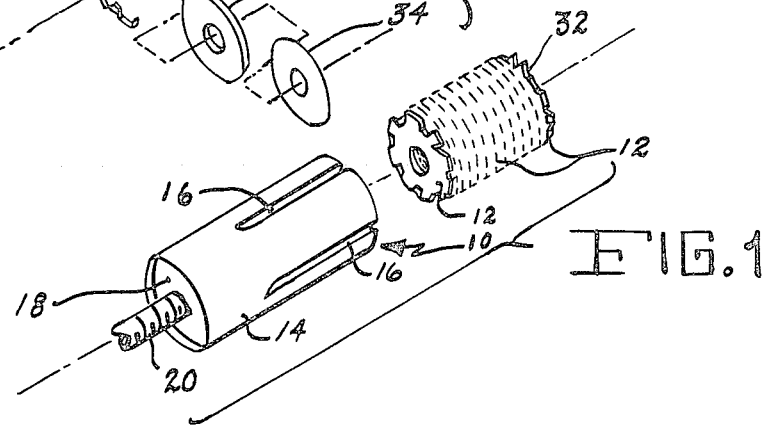
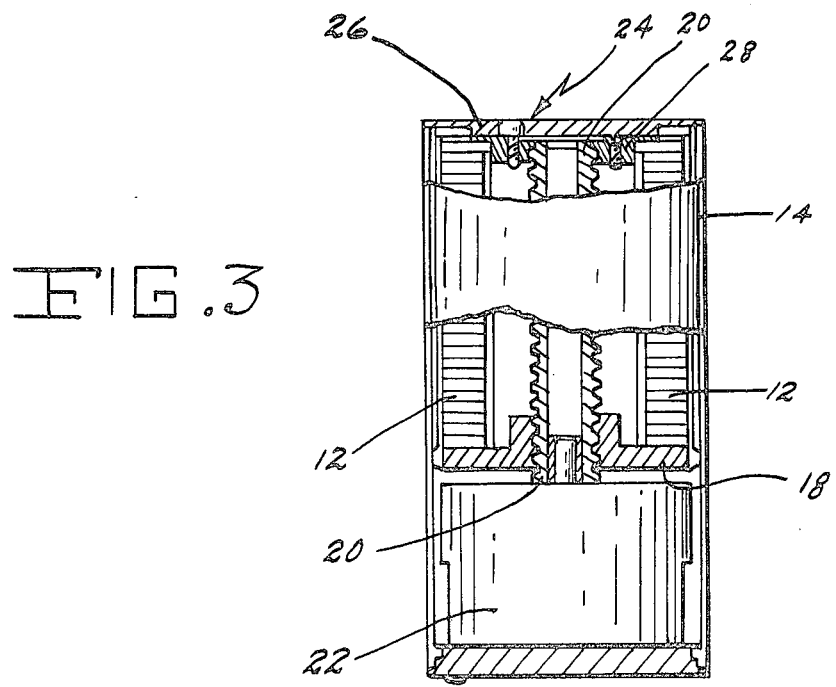

MINI-REGENERATOR

BACKGROUND OF THE INVENTION

This invention relates generally to devices for dispensing articles from a moving vehicle, and, more particularly to a mini-regenerator which is capable of dispensing radar reflectors, commonly known as chaff.

Since the invention of radar, it has been known that small strips of metal foil called radar chaff dispensed in the atmosphere in a cloud are visible to radar detectors and tend to mask or obscure the presence of targets in or on the far side of the cloud. The radar reflector material or chaff are placed in a dispenser and when airborn, at a preselected time, the dispenser is opened to discharge the reflected material. A common technique for ejecting reflected material is to place the reflective material within a container and on top of a gas generating pyrotechnic. At the proper time the pyrotechnic is ignited and the gas generated thereby expels the radar chaff from the container. While this appears to be a simple and technically feasible approach to the problem it has not worked satisfactorily in the past. These gas generating dispensers are in many cases unreliable in operation and furthermore under some circumstances damage the radar chaff itself. It has, therefore, been a long felt need to produce a low cost reliable dispenser or mini-regenerator for the positive expulsion of radar chaff or the like from a high velocity vehicle with minimum damage to the chaff.

SUMMARY OF THE INVENTION

The instant invention sets forth a mini-regenerator which is simple in operation and overcomes the problems set forth hereinabove.

The mini-regenerator of the present invention is made up of a case of such a configuration to securely hold the radar chaff in dispensing position therein. The chaff itself is in the form of a waffer or disc which has a retainer therearound in order to align and properly hold the chaff within the case. In addition, spacers are utilized between adjoining chaff in order to regulate the dispensing of this chaff at the proper time.

In order to dispense the chaff a pusher plate is located at the bottom of the container and is operably connected to a lead screw. Upon the rotation of this lead screw by a power drive the pusher plate advances in the forward direction within the case and in a timed sequence expels or dispenses the individual chaff. In addition, the mini-regenerator of this invention is capable of being packaged within a larger container so that a plurality of mini-regenerators can be dispensed simultaneously.

It is therefore an object of this invention to provide a mini-regenerator capable of effectively dispensing radar chaff at a controlled rate.

It is a further object of this invention to provide a mini-regenerator which is mechanical in its operation.

It is another object of this inventtion to provide a mini-regenerator which is highly reliable in operation, economical to produce, and which utilizes conventional, currently available components that lend themselves to standard mass producing manufacturing techniques.

For a better understanding of the present invention together with other and further objects thereof, reference is now made to the following description taken in conjunction with the accompanying drawing and its scope will be pointed out in the appended claims.

DESCRIPTION OF THE DRAWING

FIG. 1 represents an exploded pictorial view of the mini-regenerator of this invention;

FIG. 2 represents an exploded pictorial view of the radar chaff utilized with the mini-regenerator of this invention; and FIG. 3 represents a side elevational view shown partly in cross section of the mini-regenerator of this invention.

DETAILED DESCRIPTION OF THE PREFERRED EMBODIMENT

Reference is now made to FIGS. 1 and 3 of the drawing which best show the mini-regenerator 10 of this invention. Mini-regenerator 10 is a device which is capable of deploying conventional radar chaff 12 best shown in FIG. 2 of the drawing. This chaff 12 may be made of any suitable material such as copper, nickel, zinc, tin, lead, bismuth and some alloys of these metals, but preferably is made of a light-weight metal such as aluminum since its low weight causes its relatively slow decent through the air. In addition the shape of the chaff may vary in accordance to its use, however, in the embodiment disclosed hereinbelow radar chaff 12 is of a circular configuration. As with ordinary radar chaff that is dispensed after booster separation, the mini-regenerators 10 of the present invention can be deployed in a spherical pattern, disc, etc., by the proper choice of orientation, spin and springs of the cannister which contains the mini-regenerator 10.

Referring again to FIGS. 1 and 3, mini-regenerator 10 is made up of case or housing 14 of any suitable configuration so as to accommodate radar chaff 12. Housing 14 has a plurality of indentations 16 therein for properly aligning the plurality of chaff 12 in a manner to be described in detail hereinbelow.

Positioned for slideable movement within case 14 is a pusher plate 18 capable of advancing the radar chaff 12 so that chaff 12 can be singly ejected from case 14 at predetermined intervals. A lead screw 20 is threadably engaged to pusher plate 18 and secured to any suitable drive mechanism 22 (FIG. 3) such as the escapement mechanism of a conventional spirator spring (not shown). The spirator spring is capable of providing a predetermined torque over a selected period of time while a regulating device such as a conventional Junghans escapement can control the output speed thereof.

For example, the spirator spring selected could provide a minimum of 2 in. -oz torque for a period of 1800 seconds minimum while the Junghans escape is operating at a beat frequency of 76.56 cps and has an output speed of 0.5 rpm. In such a case as described hereinabove the escapement output which is connected to lead screw 20 advances pusher plate 18 at approximately 0.070 inches each 30 seconds.

The advancement of pusher plate 18 moves a plurality of radar chaff discs 12 in stack arrangement forward and dispenses one disk 12 at a time when it clears case 14. On the front end of case 14 is locking arrangement 24 which not only provides gasket sealing for mini-regenerator 10 when the mini-regenerator 10 is not in use but also provides structural support for lead screw 20. Locking arrangement 24 is made up of a cover 26 having an internally threaded sleeve 28 secured thereto. Sleeve 28 is threaded on the end opposite the drive mechanism to lead screw 20 in order to hold the locking arrangement in place. The release of locking arrangement 24 is accomplished when lead screw 20 rotates, thereby unscrewing cover 26 allowing the case 14 to be opened in a position ready to dispense chaff disks 12.

Reference is now made to FIG. 2 of the drawing which clearly shows the type of mounting arrangement for radar chaff 12 to be used in this invention. Radar chaff 12 is encased in a suitably shaped retainer 30 having a plurality of indentations 32 thereon which interact with indentations 16 on case 14 for properly aligning chaff 12 therein. Spacers 34 are positioned between radar chaff 12 to better regulate the dispensing of chaff 12 at predetermined intervals.

By the use of varying power drive mechanisms 22, radar chaff 12 dispensed by mini-regenerator 10 of this invention can be reliably timed. As lead screw 20 rotates, the pusher plate 18 moves forward thereby expelling individual radar chaff 12 in an orderly timed sequence.

Although this invention has been described with reference to a variety of embodiments it will be understood to those skilled in the art that this invention is also capable of further embodiments within the spirit and scope of the appended claims.

We claim:

1. A mini-regenerator for dispensing articles comprising a housing, a pusher plate slideably mounted within said housing, at least one article to be dispensed located adjacent said pusher plate within said housing, means encompassing said article for aligning said article within said housing, a lead screw threadably engaging said pusher plate for moving said pusher plate, a drive means operably connected to one end of said lead screw for rotating said lead screw and means releasably secured to the other end of said lead screw for locking said article within said housing whereby said article may be expelled from said housing at a predetermined time.

2. A mini-regenerator for dispensing articles as defined in claim 1 wherein said housing has at least one indentation therein and said article aligning means slideably engages said indentation.

3. A mini-regenerator for dispensing articles as defined in claim 2 wherein said locking means comprises a cover and a sleeve secured thereto, whereby said lead screw threadably engages said sleeve and upon the rotation of said lead screw causes the release of said locking means.

4. A mini-regenerator for dispensing articles as defined in claim 3 wherein a plurality of articles are located within said housing and a spacer element is positioned between adjacent articles thereby permitting the individual expulsion of articles from said housing at said predetermined time.

* * * * *